(12) United States Patent
Terwilliger et al.

(10) Patent No.: US 10,995,674 B2
(45) Date of Patent: May 4, 2021

(54) MODIFIED AIRCRAFT IDLE FOR REDUCED THERMAL CYCLING

(71) Applicant: United Technologies Corporation, Farmington, CT (US)

(72) Inventors: Neil Terwilliger, Meriden, CT (US); John P. Virtue, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 266 days.

(21) Appl. No.: 16/104,579

(22) Filed: Aug. 17, 2018

(65) Prior Publication Data
US 2020/0056549 A1    Feb. 20, 2020

(51) Int. Cl.
*F02C 7/32*    (2006.01)
*F02C 6/14*    (2006.01)
(Continued)

(52) U.S. Cl.
CPC .................. *F02C 7/32* (2013.01); *F02C 6/14* (2013.01); *F02C 7/275* (2013.01); *F02C 7/36* (2013.01); *F02C 9/18* (2013.01); *F02C 9/28* (2013.01); *F05D 2220/323* (2013.01); *F05D 2220/76* (2013.01); *F05D 2260/941* (2013.01); *F05D 2270/023* (2013.01); *F05D 2270/053* (2013.01);
(Continued)

(58) Field of Classification Search
CPC .... F02C 7/26; F02C 7/268; F02C 7/32; F02C 7/36; F02C 7/275; F02C 3/107; F02C 6/14; B64D 2027/026; B64D 2013/0644; F05D 2270/05; F05D 2270/053; F05D 2220/76; F05D 2260/85; F02K 5/00; F01D 15/08; F01D 15/10; F01D 15/12; F01D 19/00
See application file for complete search history.

(56) References Cited

U.S. PATENT DOCUMENTS 7,622,817 B2 * 11/2009 El-Refaie .................. F02C 7/32
290/52
7,802,757 B2 * 9/2010 Dooley .................... F01D 15/10
244/60

(Continued)

FOREIGN PATENT DOCUMENTS

EP    1980732 A2    10/2008

OTHER PUBLICATIONS

Extended European Search Report for EP Application No. 19190790.6, dated Dec. 12, 2019, 7 pages.

*Primary Examiner* — Alain Chau
(74) *Attorney, Agent, or Firm* — Kinney & Lange, P.A.

(57) ABSTRACT

An embodiment of an engine assembly includes a plurality of offtakes powered by a combustion turbine engine having a high spool and at least one lower spool, and a controller configured to operate the combustion turbine engine through a range between a first low-idle mode, a second high idle mode, and a maximum takeoff power rating mode. The controller operates the engine in the low-idle mode by directing at least a first portion of power from the at least one lower spool to the plurality of offtakes, and wherein the controller operates the engine in the high idle mode by increasing a speed of the high spool relative to a speed of the high spool in the low-idle mode, thereby increasing a compressor outlet ($T_3$) temperature in the high idle mode relative to a $T_3$ temperature in the low-idle mode.

17 Claims, 3 Drawing Sheets

(51) Int. Cl.
*F02C 7/275* (2006.01)
*F02C 7/36* (2006.01)
*F02C 9/28* (2006.01)
*F02C 9/18* (2006.01)

(52) U.S. Cl.
CPC .... *F05D 2270/11* (2013.01); *F05D 2270/303* (2013.01); *F05D 2270/304* (2013.01)

(56) References Cited

U.S. PATENT DOCUMENTS

| | | | | |
|---|---|---|---|---|
| 7,805,947 | B2* | 10/2010 | Moulebhar | F02C 7/32 60/787 |
| 7,997,085 | B2 | 8/2011 | Moniz et al. | |
| 8,015,828 | B2* | 9/2011 | Moniz | F02C 7/275 60/786 |
| 8,093,747 | B2* | 1/2012 | Pearson | F01D 15/10 307/9.1 |
| 8,240,124 | B2* | 8/2012 | Colotte | F02C 7/32 60/204 |
| 9,729,096 | B2* | 8/2017 | Edwards | F02C 9/00 |
| 10,208,675 | B2* | 2/2019 | Mackin | F02C 7/36 |
| 2006/0260323 | A1* | 11/2006 | Moulebhar | F02C 7/268 60/793 |
| 2008/0072568 | A1* | 3/2008 | Moniz | F02C 7/32 60/226.1 |
| 2009/0064683 | A1* | 3/2009 | Moniz | F02C 7/36 60/792 |
| 2010/0000223 | A1* | 1/2010 | Colotte | F02C 7/36 60/773 |
| 2010/0083669 | A1* | 4/2010 | Foster | B64D 31/04 60/802 |
| 2010/0126178 | A1* | 5/2010 | Hyde | F01D 15/10 60/767 |
| 2012/0119020 | A1* | 5/2012 | Burns | B64D 35/00 244/58 |
| 2013/0327014 | A1 | 12/2013 | Moulebar | |
| 2015/0244296 | A1* | 8/2015 | Edwards | F01D 15/10 290/40 B |
| 2016/0236790 | A1* | 8/2016 | Knapp | B64C 11/44 |
| 2017/0037775 | A1* | 2/2017 | Jones | F02B 33/40 |
| 2017/0226934 | A1* | 8/2017 | Robic | F02C 7/36 |
| 2017/0260872 | A1* | 9/2017 | Munevar | F01D 21/006 |
| 2018/0002025 | A1 | 1/2018 | Lents et al. | |
| 2018/0266329 | A1* | 9/2018 | Mackin | B64D 27/10 |

* cited by examiner

MODIFIED AIRCRAFT IDLE FOR REDUCED THERMAL CYCLING

BACKGROUND

The disclosure generally relates to combustion turbine engines and more specifically to reduce thermal cycling of such engines for aircraft.

Idle of gas turbine engines generally requires low thrust and fuel flow, preferably as low as possible for both. Conventionally, this means that compressor exit temperature is fairly low, yet some parts of the engine, such as the rear compressor disks and/or hub can be disadvantaged by low idle temperatures, by causing broader thermal cycles and reduced durability.

SUMMARY

An embodiment of an engine assembly includes a plurality of offtakes powered by a combustion turbine engine having a high spool and at least one lower spool, and a controller configured to operate the combustion turbine engine through a range between a first low-idle mode, a second high-idle mode, and a maximum takeoff power rating mode. The controller operates the engine in the low-idle mode by directing at least a first portion of power from the at least one lower spool to the plurality of offtakes, and wherein the controller operates the engine in the high-idle mode by increasing a speed of the high spool relative to a speed of the high spool in the low-idle mode, thereby increasing a compressor outlet ($T_3$) temperature in the high-idle mode relative to a $T_3$ temperature in the low-idle mode.

An embodiment of a method of operating an aircraft includes selectively operating an engine assembly including a multi-spool combustion turbine engine and a plurality of offtakes, the engine assembly operable through a range between a first low-idle mode, a second high-idle mode, and a maximum takeoff power rating mode. The plurality of offtakes are powered by connection to at least one lower spool of the combustion turbine engine, at least one of the plurality of offtakes configured to selectively take power from the at least one lower spool. The combustion turbine engine operates in the low-idle mode by directing at least a first portion of power from the at least one lower spool to the plurality of offtakes, and wherein the combustion turbine engine operates in the high-idle mode by increasing a speed of a high spool relative to a speed of the high spool in the low-idle mode, thereby increasing a compressor outlet ($T_3$) temperature in the high-idle mode relative to a $T_3$ temperature in the low-idle mode.

DETAILED DESCRIPTION

Figure 1:
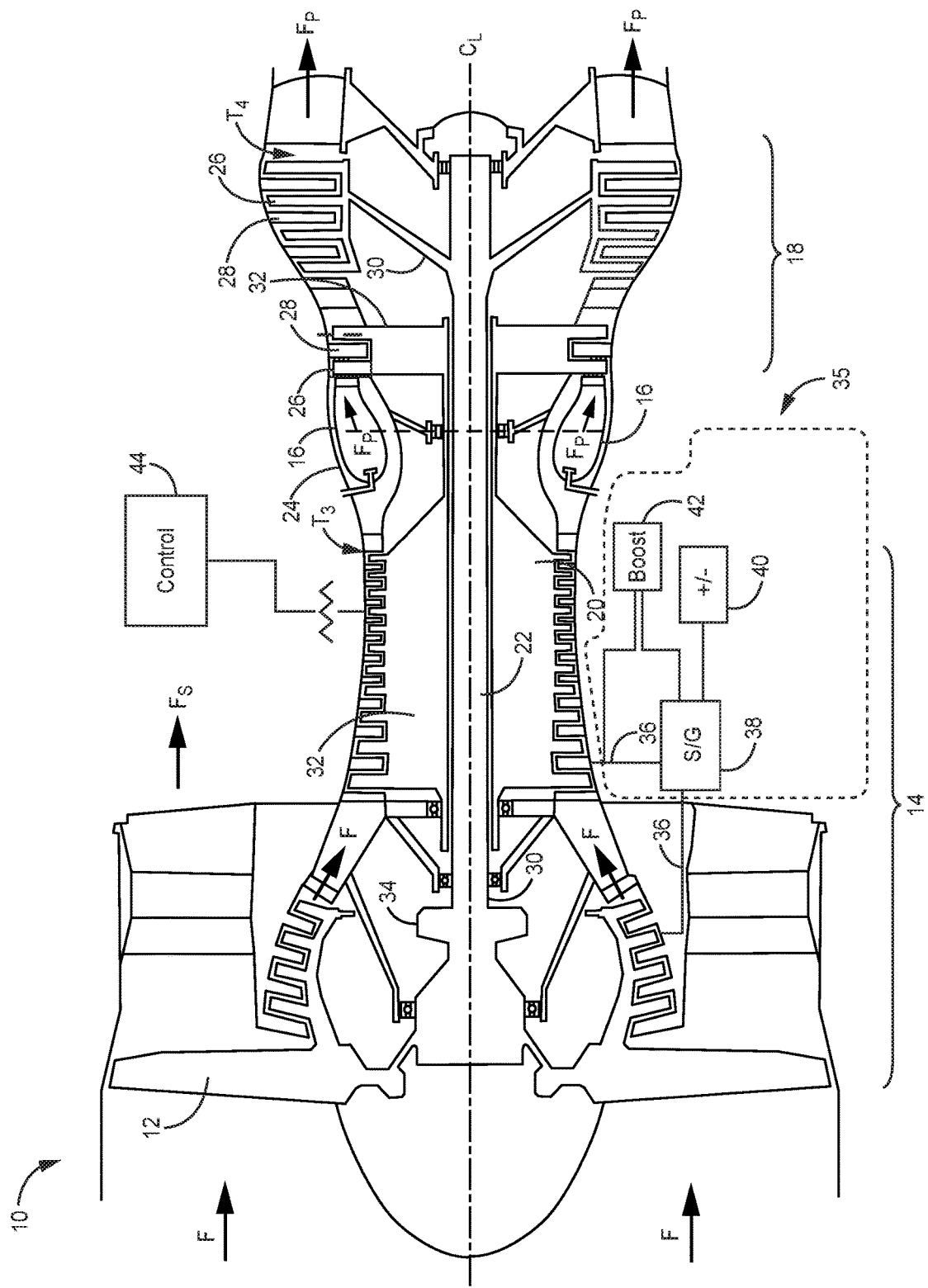
FIG. 1 shows a quarter-section view of a turbofan engine and accompanying offtakes engine offtake options and configurations to take advantage of multiple idle configurations for advanced engine configurations.

FIG. 1 is a representative, yet non-limiting illustration of gas turbine engine 10. The view in FIG. 1 is a longitudinal quarter-sectional view along engine center line $C_L$. FIG. 1 shows gas turbine engine 10 including fan 12, compressor 14, combustor 16, turbine 18, high-pressure rotor 20, low-pressure rotor 22, and engine casing 24. Turbine 18 includes rotor stages 26 and stator stages 28.

Engine 10 includes low spool 30 including low-pressure rotor 22 with a shaft connecting a low pressure portion of compressor 14 and a low pressure portion of turbine 18, as well as high spool 32 which includes high pressure rotor 20 having a coaxial shaft connecting high pressure portion of compressor 14 to a high pressure portion of turbine 18. FIG. 1 also shows optional speed reducer 34, which can be an epicyclic gearbox or other device that connects and reduces the speed of fan 12 relative to low-speed rotor 30. In embodiments omitting speed reducer 34, it will be appreciated that in most cases fan 12 will also be directly connected to low spool 30 and driven by low-pressure rotor 22. The example shown is a two-spool design but it will be appreciated that the disclosure and claims can readily be adapted to, for example, a three-spool engine which would include an intermediate spool as well (not shown).

As illustrated in FIG. 1, fan 12 is positioned along engine center line ($C_L$) at one end of gas turbine engine 10. Compressor 14 is adjacent fan 12 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan 12. Rotor stages 26 and stator stages 28 are arranged throughout turbine 18 in alternating rows. Rotor stages 26 connect to high-pressure rotor 20 and low-pressure rotor 22. Engine casing 24 surrounds turbine engine 10 providing structural support for compressor 14, combustor 16, and turbine 18, as well as containment for cooling air flows, as described below.

In operation, air flow F enters compressor 14 through fan 12 and is split into core flow Fp and bypass flow Fs. Air flow Fp is compressed by the rotation of compressor 14 driven by high-pressure rotor 20. The compressed air from compressor 14 is further divided, with a large portion going to combustor 16, and a smaller portion employed for cooling components exposed to high-temperature combustion gases, such as stator vanes, as described below. Compressed air and fuel are mixed an ignited in combustor 16 to produce high-temperature, high-pressure combustion gases Fp. Combustion core gases Fp exit combustor section 16 into turbine section 18. Stator stages 28 properly align the flow of combustion gases Fp for an efficient attack angle on subsequent rotor stages 26. The flow of combustion gases Fp past rotor stages 26 drives rotation of both high-pressure rotor 20 and low-pressure rotor 22. High-pressure rotor 20 drives at least the high-pressure part of compressor section 14, as noted above, and low-pressure rotor 22 drives at least the low-pressure part of compressor 14, as well as fan 12, either directly or indirectly, to produce thrust from gas turbine engine 10. In this example, engine 10 has two spools, low pressure spool 30 and high pressure spool 32. FIG. 1 also shows fan drive gearbox 34 being driven by low pressure spool 30 to allow for lower and more efficient fan speeds as compared to speed of the low-pressure part of compressor 14.

Further, engine 10 is connected to various accessories or offtakes 35, only a relevant few of which are shown here. Accessories or offtakes 35 are generally connected to the compressor side of low spool 30 and/or high spool 32, most often via one or more tower shafts 36, and "take off" energy generated by engine 10. In this case, tower shaft 36 links engine 10 to starter generator (S/G) 38. As apparent from the name, starter/generator 38 provides power to rotate engine 10 (specifically low spool 30, high spool 32, and/or the omitted intermediate spool) upon startup. It also generates electricity during operation of the engine for various uses, the excess of which can be stored in battery (+/−) 40.

Accessories 35 also include boost 42, regarded generally as a motive device, potentially operable via stored energy (such as via battery 40), to increase rotational speed of one or more rotors, such as during certain idle and taxi mode(s). Boost 42 can also be an electric propulsion unit, operable in series and/or parallel with engine 10, such as for a hybrid electric aircraft, and can draw stored power from enlarged battery unit(s) 40. Boost 42 is shown as a separate item, but in certain embodiments, it can take the form of a starter/generator 38 that is larger than would otherwise be called for in a conventional arrangement. It can also be a dedicated motor powered by electricity. There are other examples as well, which will be explained in the context of the disclosure. Controller 44 is programmed to operate engine 10 and one or more offtakes 35 to facilitate the operations herein.

As is generally known in the art, combustion turbine engines 10 conventionally operate in a range between a single ground idle setting and maximum takeoff/climb power setting. In some cases, even the ground idle setting, such as for engines with high thrust ratings, is high enough that the ground idle setting results in minimum thrust and speed that exceeds many airfield speed restrictions (on the order of 20 mph/32 kph to 30 mph/48 kph) during both taxi out (e.g., from the gate or boarding area to the runway) and taxi in (e.g., from runway exit to the gate or boarding area). This discrepancy between minimum idle thrust required to safely operate the engine, and resulting aircraft speed, can cause excess use of the aircraft brakes and more importantly, additional wear on hot section components. Further, even in cases where the single baseline ground idle setting is sufficient to maintain aircraft taxi speed within an acceptable range, the low baseline ground idle setting increases the range of thermal expansion and contraction of certain engine parts during ever faster aircraft/gate turnaround times.

In such cases, the quick turnaround results in more frequent and extreme thermal cycling of parts such as the rear/aft compressor components. As it is exposed to pressurized gas for the duration of a flight cycle, this area represented by $T_3$ (compressor exit temperature) also cools relatively quickly, not having been in contact with combustion products such as in the turbine/hot section. Therefore, this area has been found to be rather prone to thermal cycle fatigue as compared to other sections as the number of flight cycles increase in each engine.

Merely increasing the base ground idle speed would not be enough as the extra thrust generated thereby in a conventional engine configuration would need to be "burned" off such as by the aircraft brakes in order to maintain safe and compliant ground speed. The increased $T_4$ (turbine inlet temperature) from a higher base idle setting would also cause unwanted wear and fatigue on the even more expensive turbine/hot section hardware.

Figure 2:
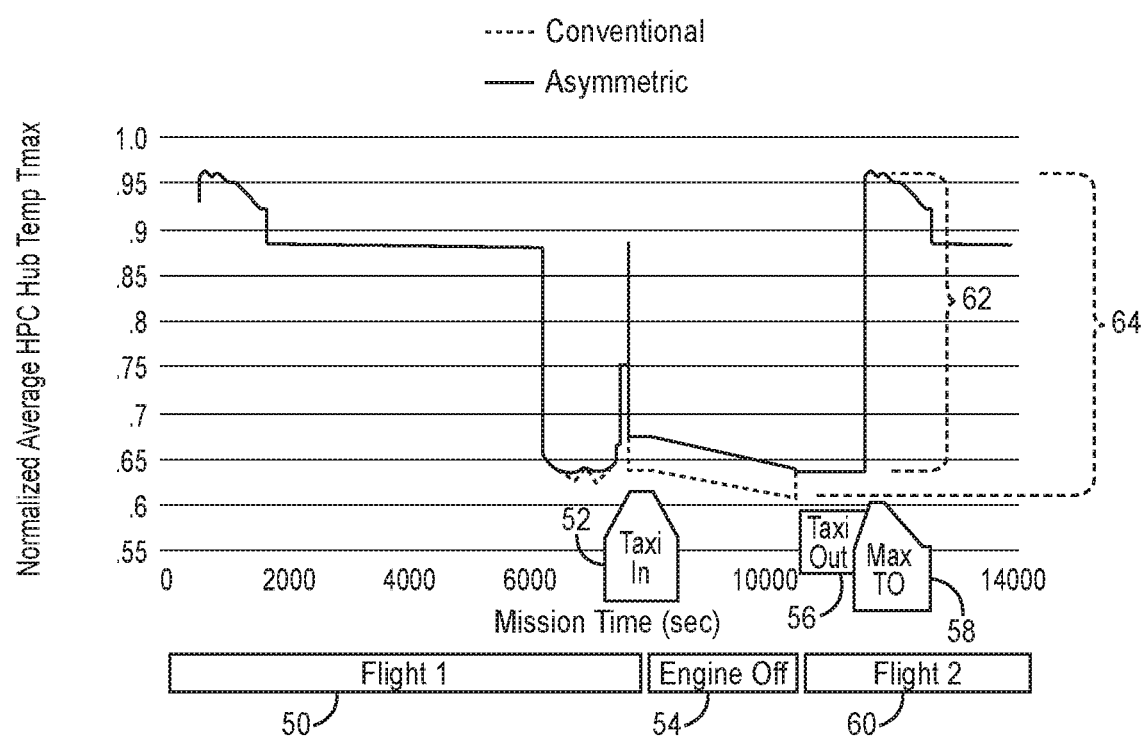
FIG. 2 shows a conventional thermal cycle with a single idle versus a revised thermal cycle with multiple idle options.

FIG. 2 compares a typical short-turnaround flight cycle with conventional single-idle to a multiple (e.g., asymmetric) idle. On the left side, during the cruise portion of first flight 50, T3 (also shown in FIG. 1) is elevated and substantially equal under both conventional and asymmetric (i.e., multiple idle) configurations. As cycle 50 comes to an end, $T_3$ drops significantly save for a short burst to operate the thrust reversers upon landing.

"Taxi in" time range is represented by the time range 52. As the plane is being turned around for the next flight, the engines are off, shown by time range 54, then followed by taxi out range 56 and take off range 58 for second flight 60.

As shown by the differential 62, the thermal cycle of engine 10 (shown in FIG. 1) with an asymmetric idle is less than it would be (differential 64) without a second higher idle speed during taxi in. In a conventional operation, the engine would be configured for a single idle, the same between taxi in and out. Comparatively, the asymmetric idle configuration allows for a higher compressor idle speed (and thus higher $T_3$) as the aircraft approaches the gate, hangar, or other deboarding area as compared to the taxi out speed or conventional single idle speed.

Of course, if the engine is expected to be off (time range 54) for a long period of time (e.g., overnight) and/or is otherwise subject to a deep cold soak in certain extreme climates, there may be minimal benefit to implementing the higher taxi in idle speed for a particular turnaround cycle.

Therefore, as seen in FIG. 2, a second optional type of ground idle can be added for taxi in, different from the lower speed and same or lower power ground idle used to taxi out, while also substantially maintaining the same level of efficiency on other components. On taxi in, specifically when fast turnaround is expected, the higher taxi-in rating may be used in order to keep $T_3$ (compressor exit temperature) relatively high for as long as possible, higher than a comparable $T_3$ for the low-idle setting. Thus the thermal cycle when the engine is off for a short period of time is less extreme. Ordinarily this would represent a waste of power and fuel, but in some cases, the additional marginal fuel burn could be more than offset by the reduced costs and downtime associated with less thermal cycle fatigue. The simplest way for this to be adapted to conventional engine designs such as in FIG. 1 is to transfer the excess power from the low spool to a higher spool (the HP spool in a two-spool engine, as well as the HP and/or IP spool, not shown, in a three-spool engine). This can be done in several ways, either through a geared or other mechanical connection, or more likely, through a combination of a generator connected to the low(er) spool and a motor powered (directly or indirectly) by the generator to assist with driving the high spool.

Compressor efficiency spoiling can also be implemented via vanes, as well as power addition/subtraction via motors/generators. This can be done directly or indirectly through use of a larger starter generator and/or a separate boost motor for the compressor so that less turbine power is needed to drive the compressor as compared to a conventional arrangement whereby the compressor is driven solely by the corresponding turbine side of each spool. These arrangements also allows for a quicker spool-up of the engine on takeoff, potentially shortening the takeoff run and adding flexibility to operate at more airfields.

Beyond this, additional power demands, accessories, and other advancements in modern aircraft design may also benefit from this higher taxi in idle speed without increasing net idle thrust in several non-limiting ways. As noted, without somewhere for the additional output power to go, this would increase wear on brakes and other components to maintain airfield speed restrictions and other limitations. Therefore, in some cases, more power can be extracted in the high(er) idle mode from the low or (optional) intermediate spool, versus the lower ground idle/taxi out mode while also using comparable amounts of fuel.

Compression can be augmented by a separate high spool motor as well (e.g., electrically operated) and may allow higher $T_3$ without the normally associated high $T_4$ (turbine inlet temperature). In general, sub-idle fuel flow (or no fuel flow at all) where offtakes (such as bleed or transfer to higher pressure compressor or spool) are handled differently between taxi in and taxi out to achieve a higher $T_3$ or an economic benefit respectively. This would be especially relevant for configurations that have more potential offtake sources available versus conventional aircraft, such as a hybrid or a more electric aircraft.

In certain embodiments, the offtakes include one or more components allowing the aircraft to be a hybrid aircraft such as an electric propulsion unit and means for storing energy to power same (e.g., batteries). The electric propulsion unit can be operable, via the controller, in series or parallel with the combustion turbine engine. In one example, the electric propulsion unit provides additional power input to at least one spool, allowing the turbine(s) to provide more exhaust and/or fan thrust without additional fuel burn during one or more parts of the flight cycle. Certain embodiments of the arrangement described herein also have particular synergy with more electric aircraft and hybrid aircraft. In most cases, the aircraft would land with relatively empty batteries, having been mostly depleted during flight. It would be expected that the batteries on the aircraft would be mostly charged (e.g., 80% to 90% of usable capacity) with airside or gate power as the plane is being turned around for the next takeoff. Thus the engine could operate on low idle during taxi out to "top off" the batteries and/or balance the individual cells using a relatively low rate of charge from the generator(s). And on taxi-in, power from the low spool could be transferred directly or indirectly (as described above) to the high spool to increase $T_3$ (without unduly increasing $T_4$) to minimize thermal cycling of the compressor during rapid turnarounds.

Figure 3:
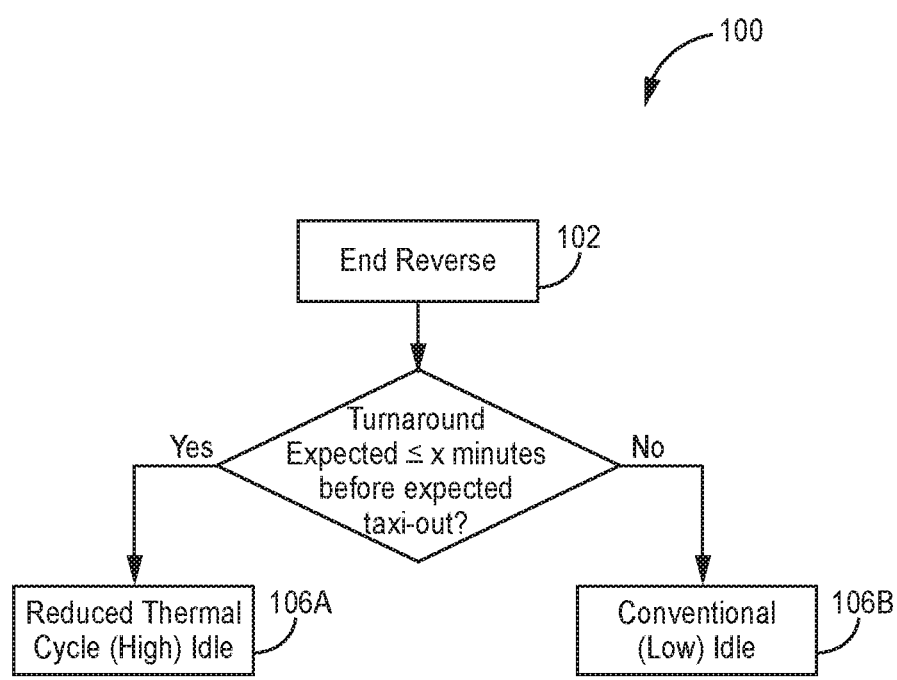
FIG. 3 is a basic decision tree for determining a preferred operational idle mode based on expected turnaround time of an aircraft.

FIG. 3 shows an example decision tree, which can take the form of a manual or electronic checklist, depending on the parameters of a particular aircraft and expected flight cycle. Chart 100 includes step 102, which corresponds to the end of thrust reverser operation as the aircraft begins to exit the runway. At step 104, it is determined whether or not a "rapid" turnaround is expected for the aircraft of less than or equal to 'x' minutes. If the expected turnaround time is less than or equal to 'x', then the answer is yes and the engine will be run at high, or reduced thermal cycle idle (106A) between the runway and the gate or other deboarding location. If the answer is no (expected turnaround time exceeds 'x'), the engine can default to conventional or low idle (106B) during at least part of the end of the flight cycle.

The value 'x' will vary according to several variables, but in the most general sense, it should not exceed the time necessary for the $T_3$ temperature to approach ambient. Because as seen in FIG. 2, the goal is to reduce the magnitude of the thermal cycle between shutdown and the next start. Therefore, the value of 'x' can depend on airfield conditions, the cooldown rate of the particular materials, likelihood of delays at a particular airfield, among others.

Per FIG. 3, as noted, the high idle can be operative on taxi in and the low idle can be operative on taxi out, and can be selected accordingly. In certain embodiments, the controller is operative to accept an input corresponding to expected turnaround time between a taxi in and a following taxi out. And in certain of these embodiments, from at least the input, the controller is configured to determine whether the taxi in operation should begin with the low idle or the high idle.

Discussion of Possible Embodiments

The following are non-exclusive descriptions of possible embodiments of the present disclosure.

An embodiment of an engine assembly includes a plurality of offtakes powered by a combustion turbine engine having a high spool and at least one lower spool, and a controller configured to operate the combustion turbine engine through a range between a first low-idle mode, a second high-idle mode, and a maximum takeoff power rating mode. The controller operates the engine in the low-idle mode by directing at least a first portion of power from the at least one lower spool to the plurality of offtakes, and wherein the controller operates the engine in the high-idle mode by increasing a speed of the high spool relative to a speed of the high spool in the low-idle mode, thereby increasing a compressor outlet ($T_3$) temperature in the high-idle mode relative to a $T_3$ temperature in the low-idle mode.

The assembly of the preceding paragraph can optionally include, additionally and/or alternatively, any one or more of the following features, configurations and/or additional components:

An engine assembly according to an exemplary embodiment of this disclosure, among other possible things includes a multi-spool combustion turbine engine including a high spool and at least one lower spool; a plurality of offtakes powered by the at least one lower spool of the combustion turbine engine; and a controller configured to operate the combustion turbine engine through a range between a first low-idle mode, a second high-idle mode, and a maximum takeoff power rating mode; wherein the controller operates the engine in the low-idle mode by directing at least a first portion of power from the at least one lower spool to the plurality of offtakes, and wherein the controller operates the engine in the high-idle mode by increasing a speed of the high spool relative to a speed of the high spool in the low-idle mode, thereby increasing a compressor outlet ($T_3$) temperature in the high-idle mode relative to a $T_3$ temperature in the low-idle mode.

A further embodiment of the foregoing engine assembly, wherein the plurality of offtakes comprises one or more of a starter/generator, a boost motor, and an electric propulsion unit.

A further embodiment of any of the foregoing engine assemblies, wherein the engine assembly is a hybrid engine assembly further comprising an electric propulsion unit and means for storing energy to power the electric propulsion unit.

A further embodiment of any of the foregoing engine assemblies, wherein the electric propulsion unit is operable in series or parallel with the combustion turbine engine.

A further embodiment of any of the foregoing engine assemblies, wherein the high-idle mode includes operating the plurality of offtakes from the lower spool to charge batteries at first charging rate to retain the increased idle speed and increased $T_3$ relative to the idle speed and $T_3$ of the low-idle mode.

A further embodiment of any of the foregoing engine assemblies, wherein the low-idle mode includes operating the plurality of offtakes from the lower spool to charge batteries at second charging rate lower than the first charging rate.

A further embodiment of any of the foregoing engine assemblies, wherein the high-idle mode is operative on taxi in and the low-idle mode is operative on either taxi-in or taxi-out.

A further embodiment of any of the foregoing engine assemblies, wherein a selection of the low-idle mode or high-idle mode on taxi-in depends at least in part on an expected turnaround time of the engine between a taxi in and a following taxi out.

A further embodiment of any of the foregoing engine assemblies, wherein the controller is operative to accept an input corresponding to the expected turnaround time of the engine.

A further embodiment of any of the foregoing engine assemblies, wherein the high-idle mode includes directing at least a second portion of power from the lower spool to the high spool.

A further embodiment of any of the foregoing engine assemblies, further comprising a generator connected to the lower spool and a corresponding motor connected to the high spool, wherein the controller is configured to operate the generator and the motor to selectively transfer a portion of power from the at least one lower spool to the high spool.

A further embodiment of any of the foregoing engine assemblies, further comprising a geared interface between the at least one lower spool and the high spool, wherein the controller is configured to operate the geared interface to selectively transfer a portion of power from the at least one lower spool to the high spool.

An embodiment of a method of operating an aircraft includes selectively operating an engine assembly including a multi-spool combustion turbine engine and a plurality of offtakes, the engine assembly operable through a range between a first low-idle mode, a second high-idle mode, and a maximum takeoff power rating mode. The plurality of offtakes are powered by connection to at least one lower spool of the combustion turbine engine, at least one of the plurality of offtakes configured to selectively take power from the at least one lower spool. The combustion turbine engine operates in the low-idle mode by directing at least a first portion of power from the at least one lower spool to the plurality of offtakes, and wherein the combustion turbine engine operates in the high-idle mode by increasing a speed of a high spool relative to a speed of the high spool in the low-idle mode, thereby increasing a compressor outlet ($T_3$) temperature in the high-idle mode relative to a $T_3$ temperature in the low-idle mode.

The method of the preceding paragraph can optionally include, additionally and/or alternatively, any one or more of the following features, configurations and/or additional components:

A method according to an exemplary embodiment of this disclosure, among other possible things includes selectively operating an engine assembly including a multi-spool combustion turbine engine and a plurality of offtakes, the engine assembly operable through a range between a first low-idle mode, a second high-idle mode, and a maximum takeoff power rating mode; powering the plurality of offtakes by connection to at least one lower spool of the combustion turbine engine, at least one of the plurality of offtakes configured to selectively take power from the at least one lower spool; and wherein the combustion turbine engine operates in the low-idle mode by directing at least a first portion of power from the at least one lower spool to the plurality of offtakes, and wherein the combustion turbine engine operates in the high-idle mode by increasing a speed of a high spool relative to a speed of the high spool in the low-idle mode, thereby increasing a compressor outlet ($T_3$) temperature in the high-idle mode relative to a $T_3$ temperature in the low-idle mode.

A further embodiment of the foregoing method, wherein the plurality of offtakes comprises one or more of a starter/generator, a boost motor, and an electric propulsion unit.

A further embodiment of any of the foregoing methods, wherein the aircraft is a hybrid aircraft further comprising an electric propulsion unit and means for storing energy to power the electric propulsion unit.

A further embodiment of any of the foregoing methods, wherein the electric propulsion unit is operable in series or parallel with the combustion turbine engine.

A further embodiment of any of the foregoing methods, wherein the high-idle mode includes operating the plurality of offtakes from the lower spool to charge batteries at first charging rate to retain the increased idle speed and increased $T_3$ relative to the idle speed and $T_3$ of the low-idle mode.

A further embodiment of any of the foregoing methods, wherein the high-idle mode is operable on taxi in and the low-idle mode is operable on taxi in or taxi out based on an expected turnaround time.

A further embodiment of any of the foregoing methods, further comprising: accepting an input corresponding to the expected turnaround time between a taxi in and a following taxi out; and from at least the input, determining whether the taxi in operation should begin with the low-idle mode or the high-idle mode.

A further embodiment of any of the foregoing methods, wherein at least a second portion of power is directed from the at least one lower spool to the high spool.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An engine assembly comprising:
a multi-spool combustion turbine engine including a high spool and at least one lower spool;
a plurality of offtakes powered by the combustion turbine engine, at least one of the plurality of offtakes configured to selectively take power from the at least one lower spool; and
a controller configured to operate the combustion turbine engine through a range between a first low-idle mode, a second high-idle mode, and a maximum takeoff power rating mode, wherein the controller is configured to select between the low-idle mode or the high-idle mode on taxi-in based at least in part on an expected turnaround time of the engine between a taxi-in and a following taxi-out;
wherein the controller operates the engine in the low-idle mode by directing at least a first portion of power from the at least one lower spool to the plurality of offtakes, and wherein the controller operates the engine in the high idle mode by increasing a speed of the high spool relative to a speed of the high spool in the low-idle mode, thereby increasing a compressor outlet ($T_3$)

temperature in the high idle mode relative to a $T_3$ temperature in the low-idle mode.

2. The engine assembly of claim 1, wherein the plurality of offtakes comprises one or more of a starter/generator, a boost motor, and an electric propulsion unit.

3. The engine assembly of claim 1, wherein the engine assembly is a hybrid engine assembly further comprising an electric propulsion unit and means for storing energy to power the electric propulsion unit.

4. The engine assembly of claim 3, wherein the electric propulsion unit is operable in series or parallel with the combustion turbine engine.

5. The engine assembly of claim 3, wherein the high-idle mode includes operating the plurality of offtakes from the lower spool to charge batteries at a first charging rate to retain the increased idle speed and increased $T_3$ relative to the idle speed and $T_3$ of the low-idle mode.

6. The engine assembly of claim 5, wherein the low-idle mode includes operating the plurality of offtakes from the lower spool to charge batteries at a second charging rate lower than the first charging rate.

7. The engine assembly of claim 5, wherein the controller is configured to operate the high-idle mode on taxi-in and the low-idle mode on either taxi-in or taxi-out.

8. The engine assembly of claim 7, wherein the controller is operative to accept an input corresponding to the expected turnaround time of the engine.

9. The engine assembly of claim 1, wherein the high-idle mode includes directing at least a second portion of power from the lower spool to the high spool.

10. The engine assembly of claim 9, further comprising a generator connected to the lower spool and a corresponding motor connected to the high spool, wherein the controller is configured to operate the generator and the motor to selectively transfer a portion of power from the at least one lower spool to the high spool.

11. A method of operating an aircraft, the method comprising:
selectively operating an engine assembly including a multi-spool combustion turbine engine and a plurality of offtakes, the engine assembly operable through a range between a first low-idle mode, a second high idle mode, and a maximum takeoff power rating mode; and
powering the plurality of offtakes by connection to at least one lower spool of the combustion turbine engine, at least one of the plurality of offtakes configured to selectively take power from the at least one lower spool;
wherein the combustion turbine engine operates in the low-idle mode by directing at least a first portion of power from the at least one lower spool to the plurality of offtakes, and wherein the combustion turbine engine operates in the high idle mode by increasing a speed of a high spool relative to a speed of the high spool in the low-idle mode, thereby increasing a compressor outlet ($T_3$) temperature in the high idle mode relative to a $T_3$ temperature in the low-idle mode; and
wherein the high idle mode is operable on taxi-in and the low-idle mode is operable on taxi-in or taxi-out based on an expected turnaround time.

12. The method of claim 11, wherein the plurality of offtakes comprises one or more of a starter/generator, a boost motor, and an electric propulsion unit.

13. The method of claim 11, wherein the aircraft is a hybrid aircraft further comprising an electric propulsion unit and means for storing energy to power the electric propulsion unit.

14. The method of claim 13, wherein the electric propulsion unit is operable in series or parallel with the combustion turbine engine.

15. The method of claim 11, wherein the high-idle mode includes operating the plurality of offtakes from the lower spool to charge batteries at a first charging rate to retain the increased idle speed and increased $T_3$ relative to the idle speed and $T_3$ of the low-idle mode.

16. The method of claim 15, further comprising:
accepting an input corresponding to the expected turnaround time between a taxi-in and a following taxi-out; and
from at least the input, determining whether the taxi-in operation should begin with the low-idle mode or the high-idle mode.

17. The method of claim 11, wherein at least a second portion of power is directed from the at least one lower spool to the high spool.

* * * * *